(12) United States Patent
Crowley

(10) Patent No.: US 6,381,900 B1
(45) Date of Patent: May 7, 2002

(54) HANGING PLANTER

(76) Inventor: Gerald J. Crowley, 535 Hill Church Rd., Boyertown, PA (US) 19512

( * ) Notice: Subject to any disclaimer, the term of this patent is extended or adjusted under 35 U.S.C. 154(b) by 0 days.

(21) Appl. No.: 09/642,637

(22) Filed: Aug. 22, 2000

(51) Int. Cl.$^7$ ................................................. A01G 9/02
(52) U.S. Cl. ..................... 47/66.1; 47/81; 47/48.5; 47/29.1; 47/29.2; 47/29.3; 47/29.4; 47/29.5; 47/29.6; 47/65.7; 47/65.8; 47/65.9; 47/66.1; 47/66.2; 47/66.3; 47/66.4; 47/66.5; 47/66.6
(58) Field of Search .................. 47/81, 485, 66.1–66.7, 47/29.1–29.6, 65.7, 65.8, 65.9

(56) References Cited

U.S. PATENT DOCUMENTS

| 303,543 A | * | 8/1884 | Prentiss | 47/31.1 |
|---|---|---|---|---|
| 599,996 A | * | 3/1898 | Engle | 47/67 |
| 1,624,504 A | | 4/1927 | Pfarr | 47/65.8 |
| 1,951,642 A | * | 3/1934 | Augustin et al. | 229/110 |
| 2,033,627 A | * | 6/1936 | Gardner | 206/423 |
| 2,491,124 A | * | 12/1949 | Martin | 239/44 |
| 2,605,588 A | * | 8/1952 | Lindstaedt | 47/67 |
| 2,996,841 A | * | 8/1961 | Loree | 47/48.5 |
| 3,304,653 A | * | 2/1967 | Zadarnowski | 119/268 |
| 3,990,179 A | * | 11/1976 | Johnson et al. | 47/67 |
| 4,102,081 A | * | 7/1978 | Morrow | 47/67 |
| 4,145,841 A | * | 3/1979 | Woolpert | 47/66.1 |
| 4,175,355 A | * | 11/1979 | Dedolph | 47/64 |
| 4,349,172 A | | 9/1982 | Banks, Jr. | 248/318 |
| 4,389,813 A | * | 6/1983 | Jaques et al. | 47/67 |
| 4,392,327 A | | 7/1983 | Sanders | 47/59 |
| D283,992 S | | 5/1986 | Tendrup et al. | D11/148 |
| 4,592,166 A | | 6/1986 | Tendrup et al. | 47/67 |
| 4,635,394 A | * | 1/1987 | Brown | 47/67 |
| 4,912,875 A | | 4/1990 | Tardif | 47/71 |
| 4,932,159 A | * | 6/1990 | Holtkamp, Sr. | 47/81 |
| D316,686 S | | 5/1991 | Tardif | |
| 5,020,274 A | * | 6/1991 | Wong | 47/67 |
| 5,333,409 A | * | 8/1994 | Mendes | 47/67 |
| 5,477,460 A | * | 12/1995 | Holtkamp, Jr. | 47/66.6 |
| D369,122 S | | 4/1996 | Lowe, Jr. | |
| 5,622,004 A | * | 4/1997 | Gidge | 47/71 |

(List continued on next page.)

FOREIGN PATENT DOCUMENTS

| GB | 2222063 | 2/1990 |
|---|---|---|
| GB | 2259842 | 3/1993 |

Primary Examiner—Charles T. Jordan
Assistant Examiner—Stephen A Holzen
(74) Attorney, Agent, or Firm—Richard C. Litman

(57) ABSTRACT

A hanging planter includes a bowl-like lower portion and a ring-like upper portion, with the upper portion nesting within the rim of the lower portion to provide a plant holding assembly. The upper edge of the lower portion and lower edge of the upper portion are crenelated, with the mating edges defining a series of plant growth openings therethrough when the two components are assembled. The crenelations are preferably of variable depths in each section, to define at least two different levels of plant growth openings through the sides of the assembly, with the upper edge of the upper portion defining a third plant growth opening for the device. Plants are selected according to their growth habits, with trailing plants being placed low in the planter, long flowering plants being placed at an intermediate level, and more upright plants being placed atop the others. The result is an essentially unbroken array of plant life covering the present planter, after the plants have grown out. The present planter is suspended by a single central hanger rod which secures through the bottom of the lower portion of the container, which provides a leakproof seal and yet allows the planter to rotate due to breezes or other effects. A fertilizer wick is placed upon the central rod, with the wick serving to deliver fertilizer to the generally centrally disposed roots of the plants, and also to wick up water from the lower portion of the planter to the plant roots.

17 Claims, 3 Drawing Sheets

U.S. PATENT DOCUMENTS

| | | | | |
|---|---|---|---|---|
| 5,722,201 A | * | 3/1998 | Diorio | 47/81 |
| 5,743,044 A | | 4/1998 | Hopkins | 47/67 |
| 6,058,651 A | | 5/2000 | Perez | 47/65.8 |
| 6,073,393 A | * | 6/2000 | Gutshe | 47/67 |
| 6,131,334 A | * | 10/2000 | Fan | 47/81 |
| 6,134,832 A | * | 10/2000 | Bokmiller et al. | 47/66.1 |
| 6,237,285 B1 | * | 4/2001 | Yoshida et al. | 47/65.9 |
| 6,230,440 B1 | * | 5/2001 | Deutsch | 47/67 |

* cited by examiner

HANGING PLANTER

BACKGROUND OF THE INVENTION

1. Filed of the Invention

The present invention relates generally to the field of horticulture, and more specifically to a novel planter assembly providing three different levels of plant growth therefrom. By selecting the appropriate plants, a person may cause the planter to become completely covered with live foliage, creating a decorative and attractive display.

2. Description of the Related Art

The use of indoor and outdoor-plants as decorative articles, has long been a conventional means of providing attractive decor in homes, offices, and other areas. Conventionally, such plants have been placed in a plastic or pottery flower pot, with the pot being placed in a tray to catch excess water, and the assembly perhaps being suspended by a macrame net and/or hanger. Such hanging planters direct the plants to grow in only one direction. i. e., upwardly out of the top of the pot, and even when the plants growing therein tend to trail downwardly, it is very difficult to train the plants to conceal the relatively unsightly pot from which they are growing.

As a result, hanging planters formed of wire mesh or screen were developed, from which plants could be directed in a generally spherical array. These planters can provide a much more attractive display, with plants radiating omnidirectionally from the contained soil pack and root ball held within the generally spherical wire mesh planter. However, this type of planter generally requires a relatively high level of care, as the root ball is essentially exposed to the air, and sun and wind if placed outdoors, which tend to dry the soil and root ball rapidly. As a result, these planters tend to require a relatively high level of maintenance, with at least frequent watering. This leads to a need for further maintenance in the form of more frequent addition of fertilizer to the planter, as the frequent waterings (or rain, if the planter is exposed to such) tend to leach the fertilizer from the soil ball.

Accordingly, a need will be seen for a hanging planter which obviates the above drawbacks of earlier developed conventional hanging planters, by providing a solid shell formed in two sections and defining a series of plant openings of different levels therebetween. The lower portion of the device is liquid tight, serving to hold a reservoir of moisture therein to preclude any need for frequent watering. Yet, the water level is not so high as to cause root rot for the plants within the planter, as their roots are generally somewhat higher than the water level. A central fertilized wick serves to draw water from the lower level of the planter, upwardly where it is absorbed by the root ball of the plants growing therein.

A discussion of the related art of which the present inventor is aware, and its differences and distinctions from the present invention, is provided below.

U. S. Pat. No. 1,624,504 issued on Apr. 12, 1927 to John H. Pfarr, titled "Flower Holder," describes a generally hemispherical welded wire basket having a drip pan welded to the bottom thereof. A hemispherical soil and root ball is formed within the wire basket, to support a plant or plants growing from the top of the planter. Pfarr stresses the importance of aeration of the soil and root ball, but notes the need for a constant supply of water to preclude excessive drying of the soil, by providing the underlying water pan or container. This precludes any possibility of surrounding the planter with vegetation, due to the greater width of the water pan and its inability to provide support for plants.

U. S. Pat. No. 3,990,179 issued on Nov. 9, 1976 to Rick S. Johnson et al., titled "Multisection Hanging Pot And Method," describes a plant pot assembly having upper and lower portions which secure positively together. The two sections define a series of lateral openings therethrough, but the openings are all of al single level, unlike the multilevel openings of the present hanging planter. The Johnson et al. planter requires that the two planter sections be positively secured together, as the only support is a series of hangers which attach to the upper rim of the upper section. The present planter is supported by a single central rod which secures through the bottom of the lower portion, thus precluding need for positive attachment of upper and lower portions.

U. S. Pat. No. 4,102,081 issued on Jul. 25, 1978 to Edwin M. Morrow, titled "Plant Container," describes a hanging planter having a single central hanger rod. The Morrow planter comprises only one outer container with an internally placed false floor, to provide a water reservoir for plants placed therein. No multiple container sections defining a series of lateral plant openings therethrough, are disclosed by Morrow. Moreover, the present hanging planter provides for the planter to turn in the wind, without unscrewing the lower end of the hanger assembly where it secures through the bottom of the container assembly. Morrow is silent on this point, but it would appear that he has not considered this function in his planter.

U. S. Pat. No. 4,349,172 issued on Sept. 14, 1982 to John J. Banks, Jr., titled "Plant Pot Suspension Apparatus And The Like," describes a notched disc placed in the bottom of the netting suspending a conventional flower pot or the like. A second macrame net may be suspended from the peripheral notches of the disc, or suspended by a single hanger secured to a loop in the center of the disc, to provide a vertical array of a series of hanging planters or containers. Banks, Jr. is silent regarding any lateral openings in the plant containers, in contrast to the hanging planter of the present invention. It is also noted that the structure of the Banks, Jr. assembly does not provide any means for allowing the planter(s) to rotate relative to the uppermost attachment (other than twisting back and forth, due to the resilience of the cord suspension), in contrast to the present hanging planter.

U. S. Pat. No. 4,592,166 issued on Jun. 3, 1986 to Donald L. Tendrup et al., titled "Multiple Section Hanging Planter," describes a two piece pot, with the lower component being of conventional shape and the upper component comprising a rim which seats within the upper edge of the lower component. The lower component also has a series of peripheral slots, with the installation of the upper component defining a series of plant growth openings through the slots. However, the Tendrup et al. assembly differs from the present hanging planter in several ways: (1) The Tendrup planter is of conventional shape; (2) Tendrup does not provide multiple levels of lateral plant growth openings, as provided by the present planter; (3) Tendrup suspends his planter by a series of peripheral hangers, rather than a single central hanger; and (4) Tendrup does not provide any means for his planter to turn or rotate in the wind, as provided by the present planter.

U. S. Pat. No. 4,912,875 issued on Apr. 3, 1990 to Pierre Tardif, titled "Flower Pot And Saucer," describes a generally conically shaped planter with a separate narrower central upwardly, projecting cone which apex includes a hole for hanging the device. The central cone includes a water reservoir in its bottom portion, which seats at the bottom of the larger planter portion. The Tardif planter is not adapted for encouraging generally omnidirectional growth of plants therefrom, as provided by the present planter invention. No lateral plant growth passages are provided by Tardif in his planter, nor is any means for allowing the assembly to rotate, as provided by the present hanging planter.

U. S. Pat. No. 5,333,409 issued on Aug. 2, 1994 to Frank, P. Mendes, titled "Hanging Pot For Growing Plants," describes a single container having a plurality of pipe-like orifices extending therefrom, for allowing the growth of plants therefrom. Mendes states that the pipes or tubes assist in supporting the weight of the plant stems as they emerge from the openings, thereby reducing breakage. This is more critical for Mendes, as his planter is directed toward the growing of fruit bearing plants, with the fruits obviously being relatively heavy. This is not necessary with the present planter. In any event, Mendes shows only a single level of plant growth passages in his planter, and suspends the device from a series of peripheral hangers which preclude rotation of the device, unlike the single central hanger of the present planter.

U. S. Pat. No. 5,743,044 issued on Apr. 28, 1998 to Jack A. Hopkins, titled "Flower Pot Support Bracket," describes a support plate with a central hanger rod which passes therethrough to support the plate. The rod also passes through the conventional drain hole in the bottom of a conventional flower pot, with the pot resting atop the plate. Several means of securing the hanger rod to the plate are described, but none permit rotation of the flower pot relative to the rod or plate, whereas the present hanging planter may rotate relative to the rod, without disassembly. Hopkins is silent regarding anything other than a conventional flower pot, devoid of any lateral openings therein.

U. S. Pat. No. 6,058,651 issued on May 9, 2000 to Jose L. Perez, titled "Hanging Plant Apparatus," describes an assembly having a conventional flower pot for a lower portion, with al flexible upper sleeve attached to the lower portion. The sleeve has a series of hanger wires extending across the top thereof, for the attachment of a hanger thereto; no single central hanger extends through the device to allow the assembly to rotate or turn, as in the present invention. The flexible fabric sleeve is randomly slit to provide a series of plant growth openings therethrough, but the conventional lower pot remains unbroken about its sides to preclude growth therethrough, unlike the present planter. Perez also provides a wick which extends generally through the center of his planter and out the bottom thereof, but the wick does not serve to water or fertilize the plants, as in the wick of the present planter. Rather, the wick of the Perez planter provides only for a person to check the moisture thereof as an indicator of when the plants need watering. It is further noted that the extension of the wick from the bottom of the Perez planter would allow water to drip therefrom after watering the plants, unlike the present planter with its sealed bottom.

U. S. Pat. No. D-283,992 issued on May 27, 1986 to Donald L. Tendrup et al., titled "Hanging Planter," is a design patent for the device disclosed in the '166 U. S. Pat. to the same inventors and discussed further above. The same differences and distinctions noted in that discussion, are seen to apply here as well.

U. S. Pat. No. D-316,686 issued on May 7, 1991 to Pierre Tardif, titled "Combined Flower Pot And Hanging Support," is a design patent for the device disclosed in the '875 U. S. Pat. to the same inventor and discussed further above. The same differences and distinctions noted in that discussion, are seen tog apply here as well.

U. S. Pat. No. D-369,122 issued on Apr. 23, 1996 to Fred W. Lowe, Jr., titled "Hanging Planter," illustrates a design having a lower planter bowl suspended from a vertically oriented cylinder by a hanger rod. No lateral plant growth passages are disclosed in the illustrations, nor is any function, such as rotation of the assembly relative to the rod, apparent in the illustrations.

British Pat. Publication No. 2,222,063 published on Feb. 28, 1990 to Kenneth E. Rigney, titled "Plant Container Assembly," describes a generally cylindrically shaped container having an open top and a series of upwardly facing spouts extending from the sides thereof. The spouts provide for the growth of plants therefrom. However, no hanger means of any sort is disclosed by Rigney, nor any means of defining a series of plant growth openings on multiple levels by assembling two components, as provided by the present invention.

Finally, British Pat. Publication No. 2,259,842 published on Mar. 31, 1993 to Acton & Acton Ltd., titled "Hanging Bag For Growing Plants," describes a flexible knit bag which is filled with, plant growth material and seedlings, and suspended from one end. The suspension end is knotted about a line, thereby precluding any significant rotation of the device. The porous nature of the material cannot control plant growth therefrom, as provided by the series of distinct, predetermined openings defined by the assembly of the upper and lower components of the present hanging planter. Moreover, the Acton & Acton Ltd. planter is porous throughout its entire length, thus allowing excess water to run therefrom and leaching any fertilizer or other critical materials from the bag. A catch pan must be used with the device to capture any liquid which drips therefrom, unlike the present planter.

None of the above inventions and patents, taken either singly or in combination, is seen to describe the instant invention as claimed.

SUMMARY OF THE INVENTION

The present invention comprises a hanging planter providing a generally spherical array of plant growth extending therefrom. The present planter is formed of a lower component having a somewhat modified hemispherical shape, with an upper section having a modified conical shape nesting within the lower section. Both the upper and lower sections have crenelated mating edges, which define a series of plant growth openings about the device when assembled.

These crenelations are of alternating depth in each of the sections, which results in the height or level of the openings being staggered about the circumference of the assembled planter. This results in three different levels for plant growth from the present planter, with two of the levels defined by the two different levels of the plant growth openings, and the third level being defined by the upper edge of the upper portion of the planter. By carefully arranging trailing plants, long stemmed flowering plants, and generally upright plants in layers within the planter, with their roots oriented inwardly toward the center of the planter, the result is a generally spherical array of plants which completely cover the present planter when they are fully grown out.

The present planter includes further features which provide further benefits as well. The present planter is suspended by a single central hanger rod which attaches through a hole in the center of the lower section of the device. The attachment provides a waterproof seal, yet allows the assembly to rotate about the rod due to breezes or other forces. A fertilizer wick is placed along the central rod, with the wick serving two functions: First, it provides a centrally disposed source of fertilizer for the plants placed within the present planter. Secondly, it wicks up water from the lower portion of the assembly, to distribute it to the centrally disposed roots of the plants within the planter. The present planter's configuration assures that the plants cannot dry out if watered regularly, nor can they suffer from overwatering.

Accordingly, it is a principal object of the invention to provide an improved hanging planter having a lower, bowl-like first component and an upper, ring-like second component which nests within the lower first component.

It is another object of the invention to provide an improved hanging planter which upper edge of the lower component and lower edge of the upper component are crenelated to define a series of plant growth openings about the circumference of the device.

It is a further object of the invention to provide an improved hanging planter which edge crenelations are of varying depth to define at least two levels of plant growth openings therethrough.

An additional object of the invention is to provide an improved hanging planter which suspension means comprises a single centrally disposed hanger rod, about which the planter assembly may rotate due to breezes or other forces.

Still another object of the invention is to provide an improved hanging planter including a centrally disposed fertilizer wick for wicking water to the plant roots contained therein, and fertilizing the plant roots as well.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention comprises a hanging planter having a series of different levels of plant growth openings therein and therefrom, and which includes a single central hanger and fertilizer wick for feeding nutrients and water to the generally centralized root ball which develops within the planter as the plants grow therein. The three different levels of plant growth openings result in an essentially spherical, or at least vertically oblate, array of plants from the present planter, depending upon the judicious planting of different varieties of plants therein. The plant array generally covers the entire planter once the plants have matured, resulting in an attractive and relatively low maintenance floral or plant display.

Figure 1:
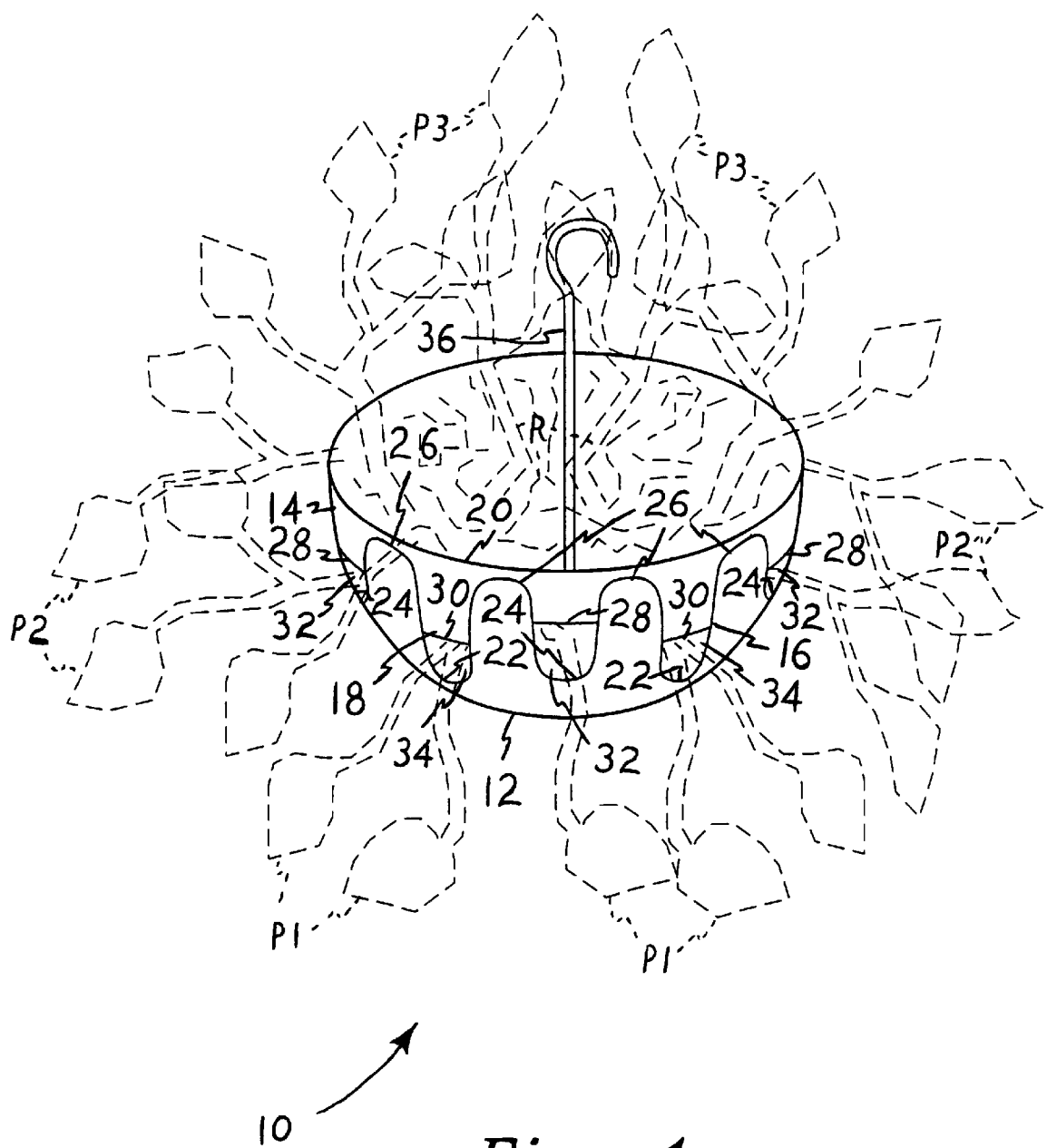
FIG. 1 is an environmental perspective view of the present hanging planter, showing its general configuration and appearance after plant growth therefrom.
Figure 2:
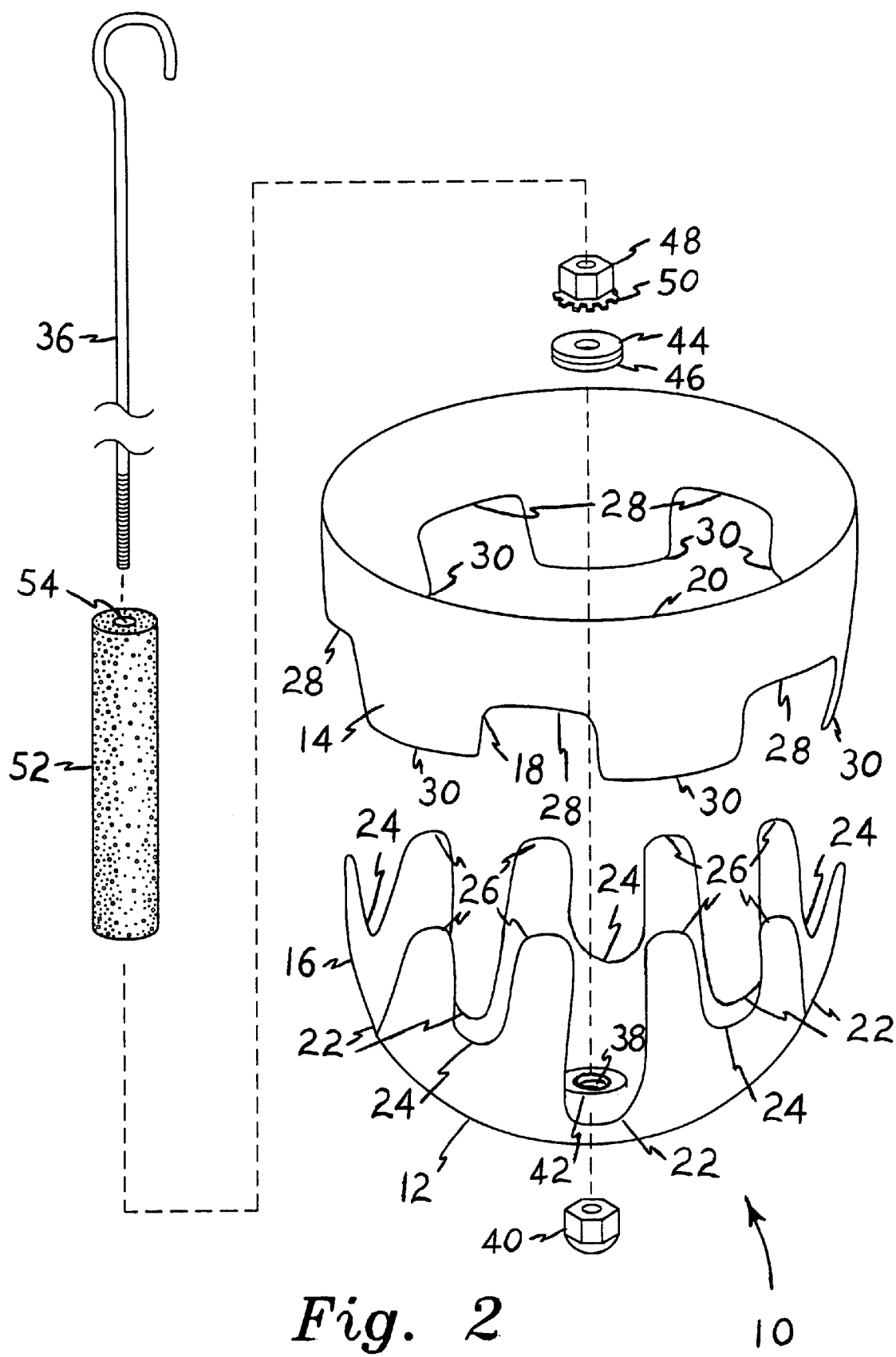
FIG. 2 is an exploded perspective view of the various components of the present hanging planter, showing their relationships to one another and order of assembly.

FIGS. 1 and 2 of the drawings respectively provide assembled and exploded perspective views of the present hanging planter, designated by the reference numeral 10 throughout the drawing Figures. The planter 10 essentially comprises a rigid lower portion 12 and a separable rigid upper portion 14 which nests within the lower portion 12. The lower portion 12 has a generally hemispherical, bowl-like shape, with a crenelated upper edge 16. The upper portion 14 has a generally ring-like or toroidal shape, with a lower edge 18 having a series of crenelations therein and a smooth opposite upper edge 20. The two portions 12 and 14, or at least the lower portion 12, may be formed of transparent or translucent plastic or other materials, if so desired. The provision of a lower portion 12 which is at least translucent, enables a person to view the water level therein, in order to preclude overwatering the device and plants contained therein.

FIGS. 1 and 2 clearly illustrate the variation in the depth of the crenelations of the lower portion 12 and the fit of the crenelated lower edge 18 of the upper portion 14 of the planter 10. It will be noted that the upper edge 16 of the lower portion 12 has alternating relatively deeper and shallower crenelations, respectively 22 and 24, which terminate in a series of raised projections 26 of equal height between each of the crenelations 22 and 24. The crenelated lower edge 18 of the upper portion 14 has alternating raised and lowered portions, respectively 28 and 30, with the raised portions 28 being of equal height to one another and the lowered portions 30 being of equal height-to one another.

The specific number of higher and lower crenelations 24 and 22 in the lower portion 12, and raised and lowered portions 28 and 30 of the crenelations in the upper portion 14, is not critical to the present planter, so long as the number and spacing of higher crenelations 24 in the lower portion 12 is equal to the number and spacing of raised portions 28 in the crenelations of the upper portion 14, and the number and spacing of lower crenelations 22 of the lower portion 12 is equal to the number and spacing of lower portions 30 in the upper portion 14 of the planter. The lower portion 12 may contain a series of five deeper crenelations 22 alternating with a series of five shallower crenelations 24, with the upper portion 14 having a like number of alternating higher and lower portions 28 and 30 of its crenelated lower edge 18, or a series of four (or three, six, eight, etc.) shallower and four deeper crenelations along the upper edge of the lower portion with a like number (e. g., three, six, eight, etc.) of higher and lower portions of the lower edge of the upper portion, etc., as desired.

It will be seen in FIGS. 1 and 2, that this arrangement places the raised crenelations 24 of the lower portion 12 in registry with the raised crenelated portions 28 of the upper portion 14, and similarly places the alternating lower crenelations 22 of the lower portion 12 in registry with the lower crenelated portions 30 of the upper portion 14, when the upper and lower portions 12 and 14 are assembled together to form the present plant container 10. The upper portion 14 is configured to nest within the upper part of the lower portion 12, as shown in the drawings.

The depth of the lower and upper crenelations 22 and 24 of the lower portion 12 is predetermined to extend below the respective lower and upper edges 30 and 28 of the upper portion 14, when the two portions 12 and 14 of the planter 10 are assembled together to form the plant container 10 as shown in FIG. 1. Thus, when the upper portion 14 is nested within the lower portion 12 with the various crenelated edge portions in registry and alignment with one another as shown in the drawings, the various crenelation depths define a series of higher and lower plant growth openings, respectively 32 and 34, through the walls of the assembled hanging planter or plant container 10.

While the present disclosure shows only two crenelation depths resulting in two plant growth opening levels, it will be readily appreciated that three different crenelation levels in the lower portion and lower edge portion heights in the upper portion of the planter, will result in three different plant growth opening heights, with four different crenelation levels providing four different opening heights, etc. As illustrated, the present planter 10 provides three different plant growth opening levels, with the first two being provided by the two levels of lateral openings 32 and 34 through the side of the planter assembly, and the uppermost third level being defined by the upper edge 20 of the upper portion 14 of the planter 10. As noted, however, any practicable number of lateral plant growth openings may be defined through the walls of the planter assembly 10, depending upon the number of different crenelation levels provided.

Figure 3:
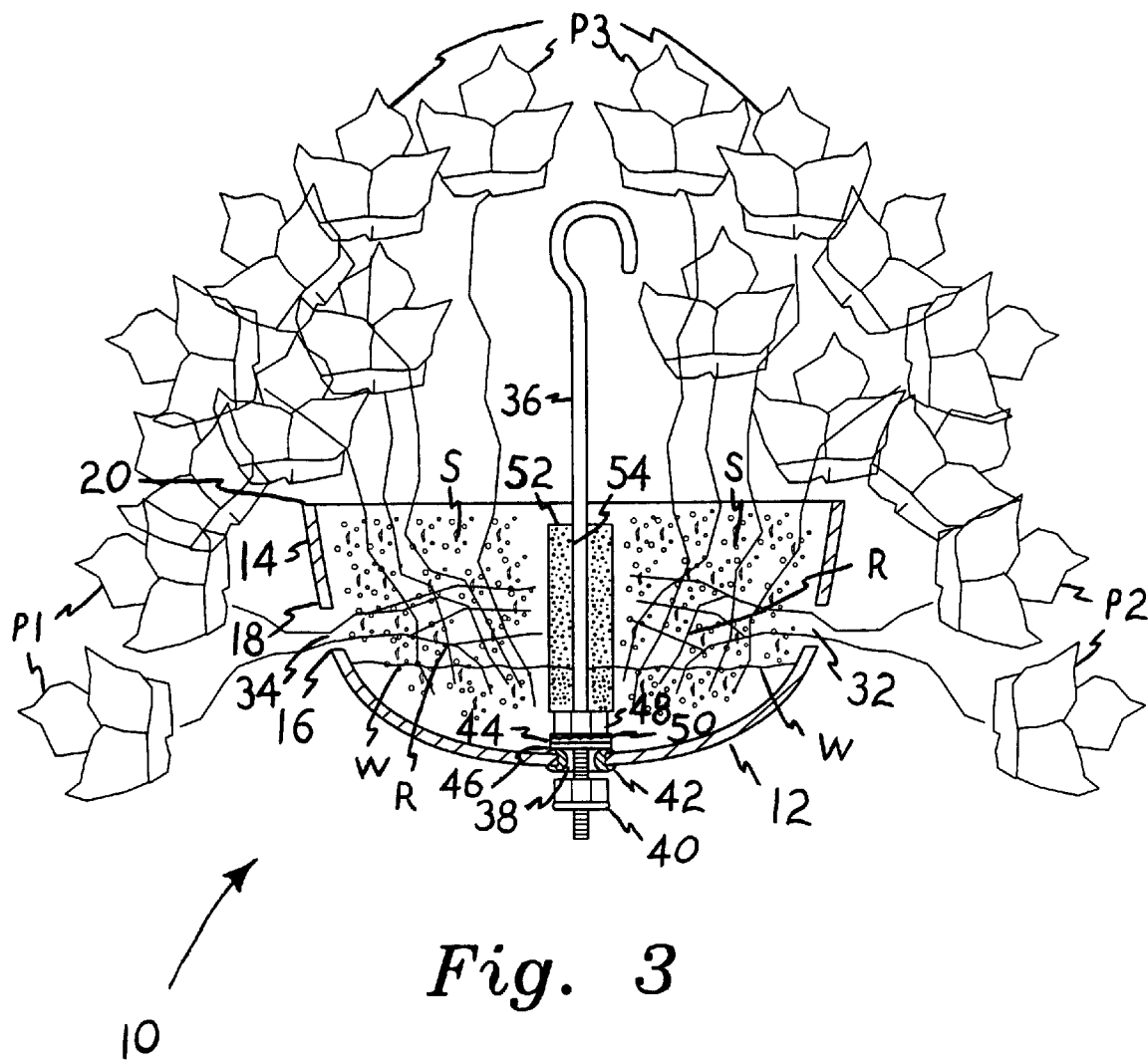
FIG. 3 is an elevation view in section of the present hanging planter, showing further details thereof as well as the arrangement of plants therein.

The present hanging planter 10 is suspended by a single, axially concentric hanger rod 36, which passes through a hanger rod passage 38 formed in the center of the bottom portion 12 of the planter 10, as shown in FIGS. 2 and 3. The lower end of the rod 36 is threaded, with a lock nut 40 being secured to the rod 36 lower end to secure the planter assembly to the rod 36.

The present planter assembly 10 includes bearing means for allowing the assembled planter container to swivel about the hanger rod 36, in the event of a breeze or other force applied to the assembly 10 which causes a rotational input. This is achieved by placing a hard annular metal grommet 42, or other suitable bearing means, in the hanger rod passage 38 of the lower portion 12 of the planter. This grommet or bearing 42 rests upon the lock nut 40 (a gap is shown in FIG. 3, for clarity in the drawing Figure) and provides a relatively low friction interface to allow rotation of the planter container about the rod 36.

As the plants of the planter 10 must be watered periodically, means must also be provided to preclude the escape of water from the hanger rod passage 38 in the bottom center of the lower portion 12 of the planter. This is achieved by means of a compound sealing washer having a hard metal upper portion 44, with a resilient rubber or other suitable elastomer material 46 bonded therebeneath. A nut 48 with a captured lock washer 50 (external tooth star washer, etc.) is threaded onto the lower end of the rod 36 above the other hardware, with the lock washer 50 bearing and locking against the hard metal washer portion 44 of the compound washer.

The above described assembly is assembled according to the exploded perspective drawing of FIG. 2, with the final assembly being as pictured in FIG. 3 of the drawings. The bottom lock nut 40 is tightened relative to the upper compound nut and washer assembly 48 and 50, just sufficiently to provide a good clamping pressure for the elastomer seal 46 of the washer 44 against the[0ax5]pper side of the grommet 42 within the lower portion 12 of the assembly 10. Proper tightening of this assembly results in a leakproof fitting, yet the lock washer 50 of the compound nut 48 is free to swivel relative to the nut 48, thus allowing the assembly comprising the planter container portions 12 and 14, the central grommet 42, the compound washer 44 and 46, and the captured lock washer 50 to turn relative to the rotationally stationary hanger rod 36, upper nut 48, and lower nut 40. Preferably, all of the metal portions of the above described hanger assembly, i. e., hanger rod 36, grommet 42, lock nut 40, metal washer portion 44, and nut and captured lock washer 48 and 50 are formed of stainless steel or other suitable corrosion resistant material.

The present planter assembly 10 may also include means for fertilizing the plants contained therein. FIGS. 2 and 3 illustrate a fertilizer wick 52 providing such means. The wick 52 has an elongate, generally cylindrical form, and includes a hanger rod passage 54 formed axially therethrough. The hanger rod 36 is inserted through the passage 54 of the fertilizer wick 52 before assembly of other components thereon, with the wick 52 resting above the compound lock nut 48 after assembly as shown in FIG. 3.

The fertilizer wick 52 is formed of a porous material, which serves to wick up water and moisture from the lower portion 12 of the planter assembly 10. As the moisture is wicked upwardly through the fertilizer wick 52 due to capillary action, it also dissolves some of the fertilizer and nutrients contained within the wick 52, thus distributing these nutrients generally radially throughout the soil contained within the assembly 10 and thus to the roots R of the plants which have been planted within the hanging planter assembly 10.

FIG. 3 provides an elevation view in section of the planter 10, with maturing plants P1 through P3 contained therein. The present planter 10 is particularly well adapted for containing a variety of plants having different growth habits, i.e., lowermost trailing or hanging plants P1, longer flowering plants P2 having lateral growth habits, and finally more upright growth plants P3. The present planter 10 is assembled as described further above, and in accordance with FIGS. 2 and 3 of the drawings. However, the upper portion 14 of the planter container is not installed at this time. Rather, a first layer of potting soil S and trailing or hanging plants P1 are placed radially in the bottom of the lower portion 12 of the assembly, with the plant roots R oriented radially inwardly and their stems trained through the lowermost crenelation slots 34. Another layer of potting soil S is placed in the lower portion 12, with a second set of plants P2 having more lateral growth patterns placed therein in a similar orientation to the lower plants P1 and trained through the upper crenelations 32.

At this point, the upper portion 14 is nested into the lower portion 12, and plants P3 having more upright growth habits are planted atop the other levels, with their orientation being generally upwards or parallel to the hanger rod 36. A final layer of potting soil S is added, the plants PI through P3 are watered, and the planter is complete, excepting normal watering, care, and pruning as necessary. FIGS. 1 and.2 illustrate the results of mature plants P1 through P3, which have grown in the planter 10 of the present invention. (It will be understood that complete growth of the lowermost level of plants P1 is not shown in FIG. 3, for clarity in the drawing Figure.)

As the plants P1 through P3 continue to grow, they will substantially surround the hanging planter 10, due to their natural growth habits. The roots R eventually form an entangled root ball within the soil S of the assembled planter 10, with the majority of the roots R disposed closely adjacent to the vertical axis of the container assembly, defined by the hanger rod 36 and the fertilizer wick 52 placed thereon. The fertilizer wick 52 delivers nutrients to the plant roots R, and at the same time its porous nature causes it to wick up water W from the lowermost portion of the planter assembly. It will be seen that the water level W cannot be higher than the lowermost crenelation slots 22 of the bottom portion 12 of the assembly. This precludes oversaturation of the plant roots R, and subsequent root rot. The transparent or translucent nature of at least the lower portion 12 of the planter, allows the water level to be observed to preclude overwatering and spillage.

In summary, the present hanging planter 10 serves as a means for providing a most attractive plant and/or floral display, in either the indoor or outdoor environment. The provision for multiple levels of plant growth provides a truly unique floral display when the plants placed in the planter are selected with a degree of care for their growth habits. While the present planter is itself a reasonably attractive article, the essentially complete coverage of the planter by mature plants growing therefrom results in concealment of the planter itself, with only the plants growing therefrom being visible. The sealing means used with the hanger rod attachment assures that no leakage will occur from the bottom of the device, yet the attachment allows the planter to turn in the breeze or due to other forces applied thereto.

As the present planter cannot leak, it may be placed in any location as desired which is suitable for the growth and health of the plants contained therein, either indoors or outdoors. The plants contained within the present planter cannot be overwatered, as may occur with other types of planters, due to the lowermost crenelation slots in the lower portion of the assembly. The fertilizer wick-provided with the present planter serves to wick up water from the lowermost portion of the planter, thereby delivering the proper amount of water to the plant roots and assuring that they will not be overwatered and suffer subsequent root damage. The water level within the planter is easily noted due to the translucency or transparency of at least the lower portion of the device, thereby assuring that excessive water will not be added.

Accordingly, the present hanging planter will prove to be a most desirable decorative accessory for anyone who appreciates the beauty of floral arrangements for display in the home, office, patios and decks, and/or any indoor or outdoor area where such a planter may be displayed.

It is to be understood that the present invention is not limited to the sole embodiment described above, but encompasses any and all embodiments within the scope of the following claims.

I claim:

1. A hanging planter, comprising:
   a plant container having at least a lower portion;
   a hanger rod passage formed centrally through said lower portion;
   a single hanger rod fastened through said hanger rod passage of said lower portion, for suspendibly supporting said plant container;
   a generally cylindrical fertilizer wick having an axial passage therethrough and installed about said hanger rod within said plant container; and
   said fertilizer wick further including means for wicking up water within said lower portion for distribution through soil contained within said plant container, and means for fertilizing plants having roots contained within said plant container.

2. The hanging planter according to claim 1, wherein:
   said lower portion of said plant container has a rigid, bowl-like, generally hemispherical configuration with an upper edge;
   said plant container further includes an upper portion having a rigid, ring-like, generally toroidal configuration with a lower edge and an upper edge, for nesting within said lower portion;
   a plurality of crenelations formed along said upper edge of said lower portion and said lower edge of said upper portion;
   said crenelations of said lower portion having a series of alternating depths; and
   said alternating depth crenelations of said lower portion defining a plurality of different levels of plant growth openings of said plant container, and said upper edge of said upper portion defining an uppermost plant growth opening of said plant container, when said lower portion and said upper portion are assembled together to form said plant container.

3. The hanging planter according to claim 1, further including:
   bearing means disposed at said hanger rod passage of said lower portion, allowing rotation of said plant container relative to said hanger rod;
   locking means precluding inadvertent unfastening of said hanger rod from said lower portion; and
   sealing means precluding fluid leakage through said hanger rod passage of said lower portion.

4. The hanging planter according to claim 3, wherein:
   said bearing means comprises an annular metal grommet set in said hanger rod passage of said lower portion;
   said locking means comprises a lock nut threadably secured to said hanger rod below said lower portion; and
   said sealing means comprises an elastomer seal bonded to a washer and disposed immediately above and in contact with said metal grommet of said lower portion.

5. The hanging planter according to claim 4, wherein said hanger rod, said bearing means, said locking means, and said sealing means are each formed of corrosion resistant materials.

6. The hanging planter according to claim 1, wherein at least said lower portion is translucent.

7. A hanging planter, comprising:
   a rigid, bowl-like, generally hemispherical lower portion with an upper edge;
   a rigid, ring-like upper portion having a generally toroidal shape with a lower edge and an upper edge;
   said upper portion nesting within said lower portion to form a plant container;
   said upper edge of said lower portion and said lower edge of said upper portion each having a plurality of crenelations formed therein;
   said crenelations of said lower portion having a series of alternating depths;
   said alternating depth crenelations of said lower portion defining a plurality of different levels of plant growth openings of said plant container, and said upper edge of said upper portion defining an uppermost plant growth opening of said plant container, when said lower portion and said upper portion are assembled together to form said plant container;
   a hanger rod passage formed centrally through said lower portion;
   a single hanger rod fastened through said hanger rod passage of said lower portion, for suspendibly supporting said plant container;

said fertilizer wick including an axial passage therethrough and installed about said hanger rod within said plant container; and said fertilizer wick further including means for wicking up water within said lower portion for distribution through soil contained within said plant container, and means for fertilizing plants having roots contained within said plant container.

8. The hanging planter according to claim 7, further including:

bearing means disposed at said hanger rod passage of said lower portion, allowing rotation of said plant container relative to said hanger rod;

locking means precluding inadvertent unfastening of said hanger rod from said lower portion; and sealing means precluding fluid leakage through said hanger rod passage of said lower portion.

9. The hanging planter according to claim 8, wherein:

said bearing means comprises an annular metal grommet set in said hanger rod passage of said lower portion;

if said locking means comprises a lock nut threadably secured to said hanger rod below said lower portion; and said sealing means comprises an elastomer seal bonded to a washer and disposed immediately above and in contact with said metal grommet of said lower portion.

10. The hanging planter according to claim 9, wherein said hanger rod, said bearing means, said locking means, and said sealing means are each formed of corrosion resistant materials.

11. The hanging planter according to claim 7, wherein at least said lower portion is translucent.

12. A hanging planter, comprising:

a rigid, bowl-like, generally hemispherical lower portion with an upper edge;

a rigid, ring-like upper portion having a generally toroidal shape with a lower edge and an upper edge;

said upper portion nesting within said lower portion to form a plant container;

a hanger rod passage formed centrally through said lower portion;

a single hanger rod fastened through said hanger rod passage of said lower portion, for suspendibly supporting said plant container;

a generally cylindrical fertilizer wick;

said fertilizer wick including an axial passage therethrough and installed about said hanger rod in said plant container; and said fertilizer wick further including means for wicking up water within said lower portion for distribution through soil contained within said plant container, and means for fertilizing plants having roots contained within said plant container.

13. The hanging planter according to claim 12, further including:

a plurality of crenelations formed along said upper edge of said lower portion and said lower edge of said upper portion;

said crenelations of said lower portion having a series of alternating depths; and said alternating depth crenelations of said lower portion defining a plurality of different levels of plant growth openings of said plant container, and said upper edge of said upper portion defining an uppermost plant growth opening of said plant container, when said lower portion and said upper portion are assembled together to form said plant container.

14. The hanging planter according to claim 12, further including:

bearing means disposed at said hanger rod passage of said lower portion, allowing rotation of said plant container relative to said hanger rod;

locking means precluding inadvertent unfastening of said hanger rod from said lower portion; and sealing means precluding fluid leakage through said hanger rod passage of said lower portion.

15. The hanging planter according to claim 14, wherein:

said bearing means comprises an annular metal grommet set in said hanger rod passage of said lower portion;

said locking means comprises a lock nut threadably secured to said hanger rod below said lower portion; and said sealing means comprises an elastomer seal bonded to a washer and disposed immediately above and in contact with said metal grommet of said lower portion.

16. The hanging planter according to claim 15, wherein said hanger rod, said bearing means, said locking means, and said sealing means are each formed of corrosion resistant materials.

17. The hanging planter according to claim 12, wherein at least said lower portion is translucent.

* * * * *